US011883979B1

(12) United States Patent
Xie

(10) Patent No.: US 11,883,979 B1
(45) Date of Patent: Jan. 30, 2024

(54) METHOD AND APPARATUS FOR PRODUCING ENGINEERED STONE SLABS WITH VARIABLE WIDTH VEINS

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 18/242,935

(22) Filed: Sep. 6, 2023

(51) Int. Cl.
*B28B 1/00* (2006.01)
*B28B 11/04* (2006.01)
*B28B 11/08* (2006.01)
*B28B 11/00* (2006.01)

(52) U.S. Cl.
CPC ............ *B28B 1/005* (2013.01); *B28B 11/001* (2013.01); *B28B 11/048* (2013.01); *B28B 11/0863* (2013.01)

(58) Field of Classification Search
CPC .... B28B 1/005; B28B 13/028; B28B 13/0295
See application file for complete search history.

(56) References Cited

U.S. PATENT DOCUMENTS 9,511,516 B2 12/2016 Xie
9,707,698 B1 7/2017 Xie
10,376,912 B2 8/2019 Xie
10,751,911 B2 8/2020 Toncelli
10,843,977 B2 11/2020 Xie
2008/0079185 A1* 4/2008 Jamrussamee ........ B28B 13/026 264/86
2017/0355101 A1* 12/2017 Toncelli .............. B28B 13/0295
2018/0194164 A1 7/2018 Benito Lopez et al.
2019/0143743 A1* 5/2019 Kwak ..................... B28B 1/005 430/5
2021/0229313 A1 7/2021 Rodriguez Garcia et al.
2022/0097258 A1* 3/2022 Toncelli .............. B28B 13/0295

FOREIGN PATENT DOCUMENTS

CN 1669755 A 3/2004
CN 108127767 3/2021
ES 2713776 B2 5/2019
WO WO-2005090034 A1 * 9/2005 ............ B28B 1/005
WO WO2022/172242 A1 8/2022

* cited by examiner

*Primary Examiner* — Arrie L Reuther
*Assistant Examiner* — Virak Nguon
(74) *Attorney, Agent, or Firm* — Walter J. Tencza, Jr.

(57) ABSTRACT

An apparatus including a tool device configured to be used in the manufacturing of engineered stone slabs. The tool device may be configured to travel in an x-y plane in order to create a physically disrupted region in a mixture of resin and aggregate minerals. The tool device may have a mechanism configured to vary a width of the physically disrupted region of the mixture while traveling in the x-y plane. The apparatus may further include a spray device, which is configured to deposit colorant in an area in a wake of travel of the tool device in the x-y plane. The spray device may be configured to deposit colorant in an area while the physically disrupted region is being created in the area. The tool device may be a carving device with a V-shaped component. The tool device may be a stirring device having one or more prongs.

44 Claims, 11 Drawing Sheets

METHOD AND APPARATUS FOR PRODUCING ENGINEERED STONE SLABS WITH VARIABLE WIDTH VEINS

FIELD OF THE INVENTION

The present application relates to methods and apparatus for producing engineered stone slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications. The production of engineered stone generally involves particulate materials such as ground quartz rock, crushed glass, rocks, pebbles, sand, shells, silicon, and other inorganic mineral materials combined with polymers, binders, resins, colorants, dyes, etc. The particulate material(s) may be varying sizes ranging from four hundred mesh particle size to four mesh particle size with multiple materials of different sizes used simultaneously. The polymer(s) may include agents such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be evenly distributed into a supporting mold, tray, or other supporting structure. The mixture may also be slightly compressed to make the surface of the distributed material more even and smooth. The mold or tray containing the damp mixture is then moved onto a conveyor belt with a backing sheet, then a processed damp "slab" is moved into a vacuum press machine to compress the material. The compressed material is then placed into a curing machine to be heated into a hardened quartz slab. After curing, the hardened slab is generally moved to a grinder to be grinded down to a desired thickness, followed by a polisher to finish the product.

Quartz based stone has many advantages over natural stone such as marble and granite. Compared to these natural stones, quartz is harder, stronger, less water absorbent, and more resistant to staining, scratching, breakage, chemicals, and heat. One of the drawbacks of quartz is its perceived lack of natural, random looking veins and color patterns compared with natural stones.

Using the equipment and methods disclosed in the present invention, engineered stone slabs may be produced that more closely resemble natural stone such as marble. The process includes simple yet flexible functions which effectively solve the problem of the lack of natural coloration and pattern found in the prior art of engineered stone manufacturing. In both residential and commercial applications, the demand for engineered stone products is continuing to increase, especially those products that more closely resemble natural stone. The technical advantages of the present invention are a significant development and result in a considerable economic benefit.

There are many examples in the prior art that teach how to make marbleized engineered stone such as the methods disclosed in Chinese patent CN108127767 by Xie, the methods disclosed in U.S. patent U.S.10751911 by Toncelli, etc. All these methods try to imitate the marbleized appearance of natural stone. However, the problem of how to achieve the appearance of varying width of veins found in natural stone has not yet been sufficiently solved.

SUMMARY OF THE INVENTION

The present invention disclosed a method and apparatus for forming engineered stone slabs with variable width veins. The apparatus comprises a computer processor, tool devices which may include a carving device or a stirring device, a coloring device, support or conveying devices which may include conveyor belts, and a support device for supporting the tool device which may respond to commands from a computer processor to move the tool device in the x, y and z directions as well as rotation about the z axis. The tool device is lowered into an uncured engineered stone mixture of resin and aggregate minerals which may be placed on a supporting structure or conveyor belt and moved around in order to physically manipulate the mixture. The carving device may have an adjustable width so the width of the groove being carved may be adjusted in real time. The stirring device may have multiple prongs which rotate about the z axis, and the distance between the prongs may be adjusted in real time so the width of the region of the mixture being manipulated may vary. A coloring device may be configured to deposit colorant into a region of the mixture that has been physically manipulated by either tool device at the same time or after the tool device has physically manipulated the mixture. The above methods and equipment are used for the production of engineered stone slabs with variegated veins of varying width, solving the problem present in existing technology where engineered stone slabs lack the more natural looking veins and variegation when compared to natural stones such as marble.

In at least one embodiment, an apparatus is provided comprising: a tool device configured to be used in the manufacturing of engineered stone slabs; and wherein the tool device is configured to travel in an x-y plane in order to create a physically disrupted region in a mixture of resin and aggregate minerals; and wherein the tool device has a mechanism which is configured to vary a width of the physically disrupted region of the mixture while traveling in the x-y plane.

The apparatus may further include a spray device; and wherein the spray device is configured to deposit colorant in an area in a wake of travel of the tool device in the x-y plane. The spray device may be configured to deposit colorant in an area while the physically disrupted region is being created in the area.

The spray device may be configured to be controlled to adjust the area to match a width of the tool device during operation of the tool device. The spray device may be configured to be controlled to adjust the area to match a width of the tool device during operation of the tool device.

In at least one embodiment, the tool device is a carving device with a V-shaped component having a vertex which is configured to cut through the mixture of resin and aggregate minerals and thereby create the physically disrupted region when the carving device travels in the x-y plane.

In at least one embodiment, the tool device is a carving device; and wherein the carving device has a mechanism that allows a width of the carving device to be adjusted to thereby adjust the width of the physically disrupted region while moving in the x-y plane in the mixture.

In at least one embodiment of the present invention, the tool device is a stirring device having one or more prongs; and wherein the one or more prongs are configured to rotate to disrupt the mixture while the tool device travels in the x-y plane in the mixture to thereby create the physically disrupted region in the mixture. The one or more prongs may include a first prong; wherein the first prong is configured to rotate about a first axis of rotation; wherein the tool device is configured to rotate about a second axis of rotation, which is different from the first axis of rotation; and wherein a distance of the first axis of rotation from the second axis of rotation is adjustable to thereby adjust the width of the physically disrupted region. The one or more prongs may include a plurality of prongs; and wherein a distance of each of the plurality of prongs to a most adjacent other prong of the plurality of prongs is adjustable to thereby adjust the width of the physically disrupted region.

The tool device may be controlled by a computer processor to adjust the mechanism while the tool device is travelling in the x-y plane to vary the width of the physically disrupted region. The tool device may be controlled by the computer processor to rotate about a z-axis which is perpendicular to the x-y plane.

The carving device may be configured to rotate about a z-axis which is perpendicular to the x-y plane, so that the vertex of the V-shaped component of the carving device always points in the direction of travel of the carving device in the x-y plane.

The carving device may have a component which compresses and shapes the mixture adjacent to the physically disrupted region during operation of the carving device so the mixture does not fall into the physically disrupted region.

In at least one embodiment of the present invention a method is provided which includes the steps of: causing a tool device to travel in an x-y plane in order to create a physically disrupted region in a mixture of resin and aggregate minerals; using a mechanism of the tool device to vary a width of the physically disrupted region of the mixture while traveling in the x-y plane; and wherein the tool device configured to be used in the manufacturing of engineered stone slabs.

A spray device may be connected to the tool device; and wherein the spray device is configured to deposit colorant in an area in a wake of travel of the tool device in the x-y plane. The method may further include using the spray device to deposit colorant in an area while the physically disrupted region is being created in the area.

The method may further include controlling the spray device to adjust the area to match a width of the tool device during operation of the tool device. The method may further include controlling the spray device to adjust the area to match a width of the tool device during operation of the tool device.

The method may further include using a carving device with a V-shaped component having a vertex to cut through the mixture of resin and aggregate minerals and thereby create the physically disrupted region when the carving device travels in the x-y plane.

The method may further include using a carving device that has a mechanism that allows a width of the carving device to be adjusted to thereby adjust the width of the physically disrupted region while moving in the x-y plane in the mixture.

The method may further include rotating one or more prongs of a stirring device to disrupt the mixture while the tool device travels in the x-y plane in the mixture to thereby create the physically disrupted region in the mixture.

A first prong of the one or more prongs may be configured to rotate about a first axis of rotation; wherein the tool device is configured to rotate about a second axis of rotation, which is different from the first axis of rotation; and wherein a distance of the first axis of rotation from the second axis of rotation is adjustable to thereby adjust the width of the physically disrupted region.

The method may further include adjusting a distance of each of a plurality of prongs to a most adjacent other prong of the plurality of prongs to thereby adjust the width of the physically disrupted region.

The method may further include using a computer processor to control the tool device to adjust the mechanism while the tool device is travelling in the x-y plane to vary the width of the physically disrupted region.

The method may further include using the computer processor to control the tool device to rotate about a z-axis which is perpendicular to the x-y plane.

DETAILED DESCRIPTION OF THE DRAWINGS

Figure 1:
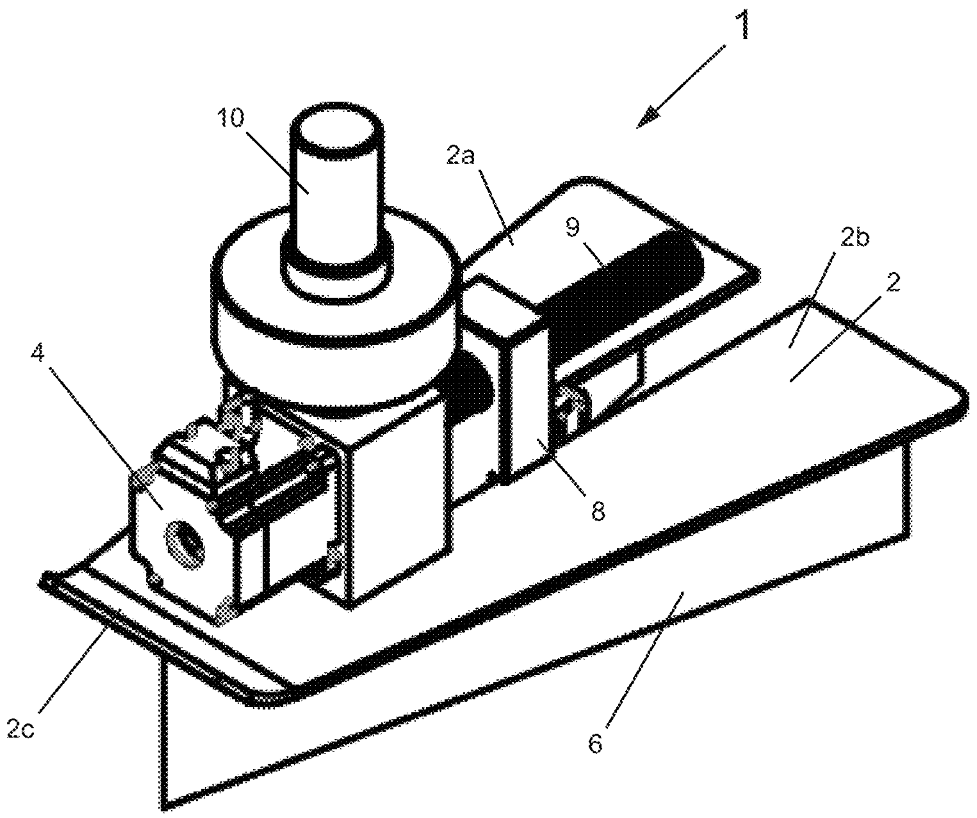
FIG. 1 shows a perspective view of a carving device, for use in accordance with an embodiment of the present invention.
Figure 2:
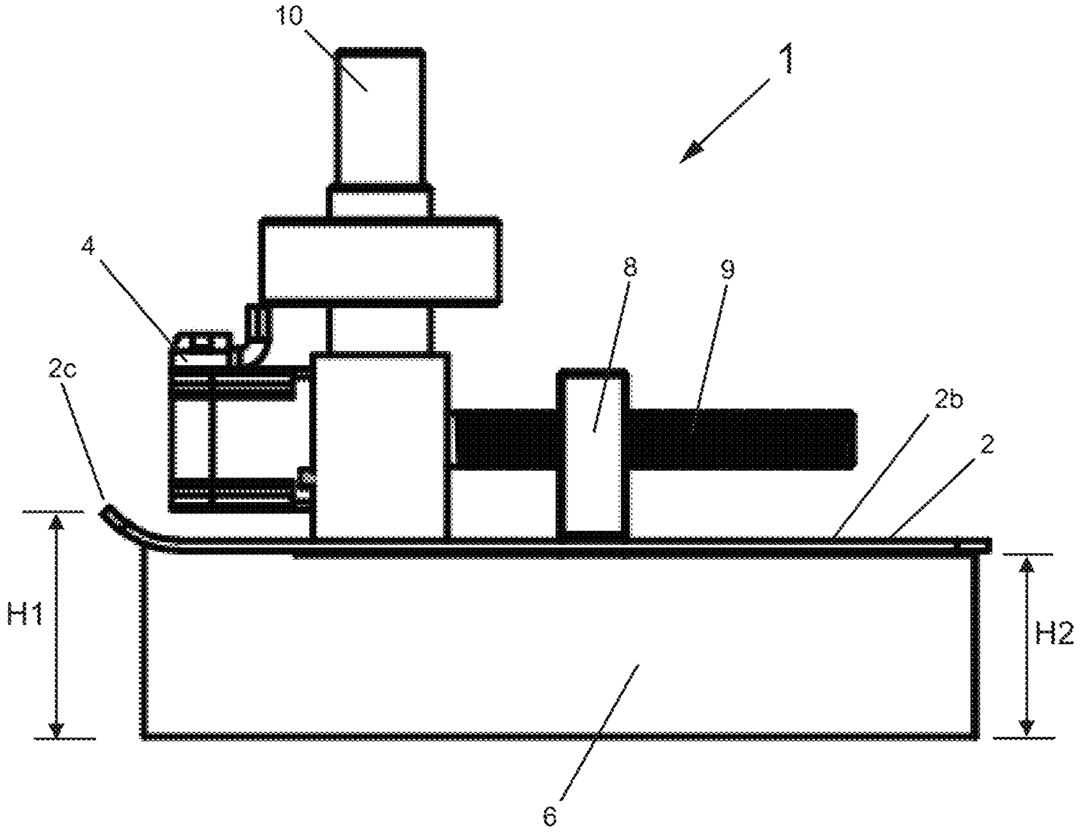
FIG. 2 shows a side view of the carving device of FIG. 1.
Figure 3:
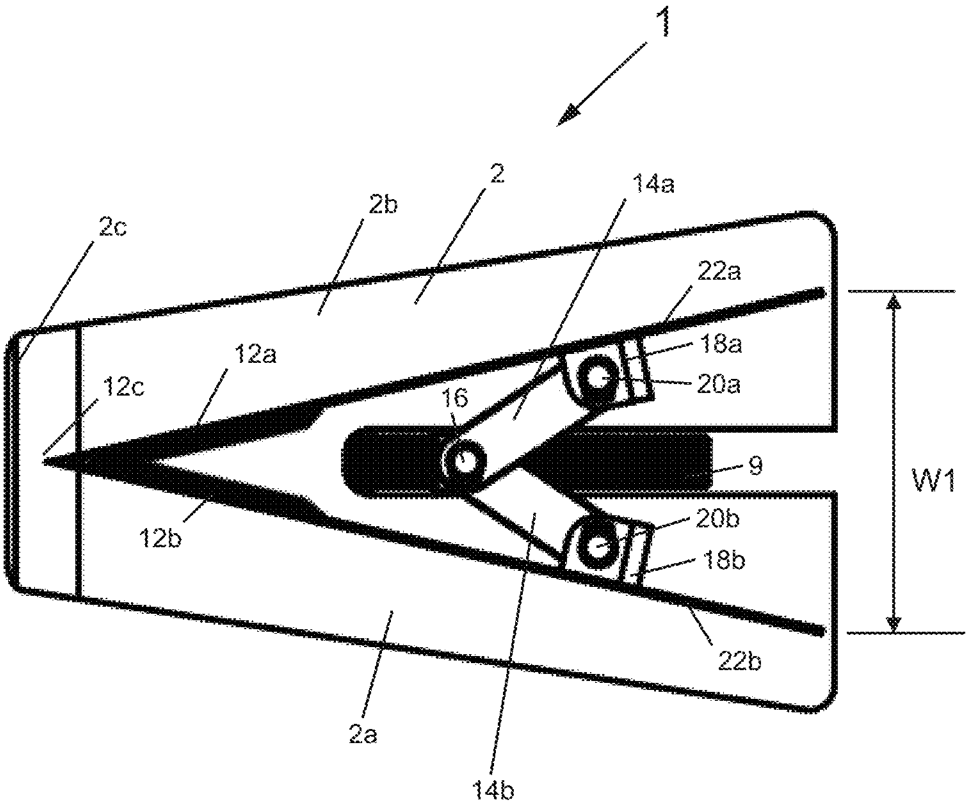
FIG. 3 shows a bottom view of the carving device of FIG. 1 with vertical v-shaped members in a narrower configuration.
Figure 4:
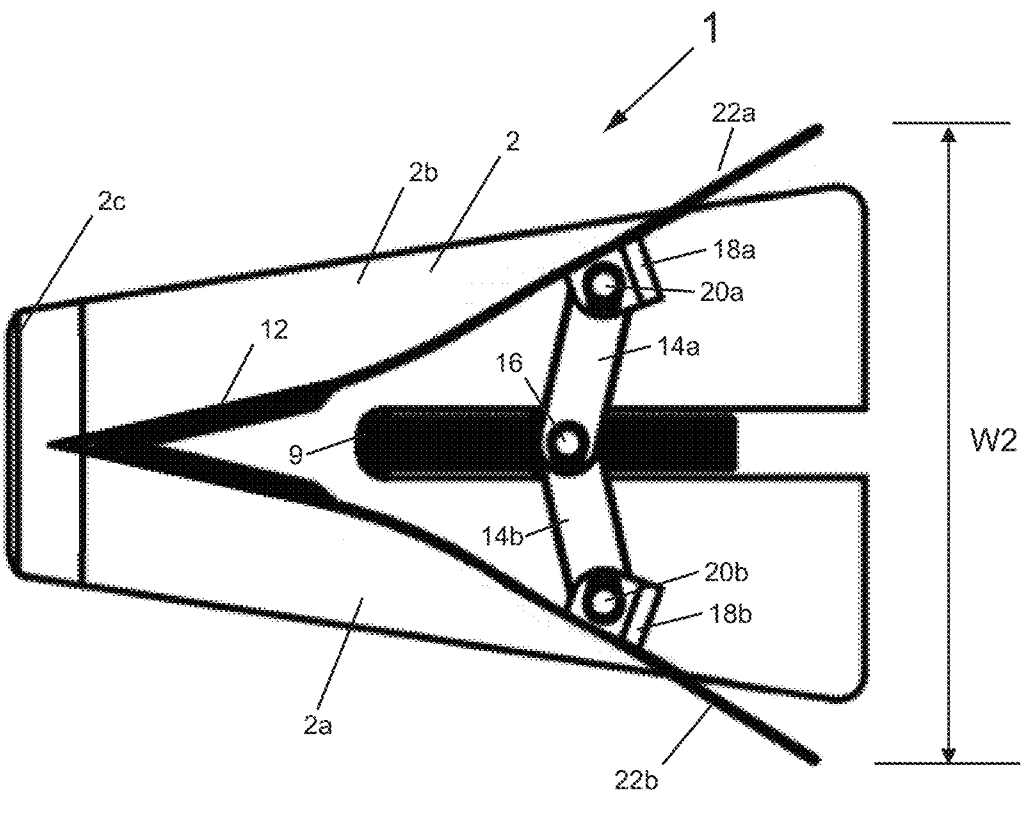
FIG. 4 shows a bottom view of the carving device of FIG. 1, with the vertical v-shaped members in a wider configuration.

FIG. 1 shows a perspective view of a carving device 1, for use in accordance with an embodiment of the present invention. FIG. 2 shows a side view of the carving device 1 of FIG. 1. FIG. 3 shows a bottom view of the carving device 1 of FIG. 1 with vertical v-shaped members 22*a* and 22*b* in a narrow configuration. FIG. 4 shows a bottom view of the carving device 1 of FIG. 1, with the vertical v-shaped members 22*a* and 22*b* in a wide configuration.

The carving device 1 may include a press plate 2, which includes first flat portion 2*a*, second flat portion 2*b*, and up curved front portion 2*c*. The carving device 1 may further include carving width driving motor 4, adjustable width carving body 6, carving width driving mechanism 8 (or nut block), and shaft 10 (which rotates about a Z axis to direct the carving device 1).

Referring to FIG. 2 and FIG. 3, the carving device 1 may further include screw 9 which may be used to move the nut block 8 back and forth so that the member 16 will move back and forth and to open or close components 14*a*, 22*a*, and 14*b*, and 22*b*. The carving device 1 may include members 12*a* and 12*b*, members 14*a* and 14*b*, pivot pin 16, members 18*a* and 18*b*, pivot pins 20*a* and 20*b*, and members 22*a* and 22*b*.

Figures 5A, 5B, 5C:
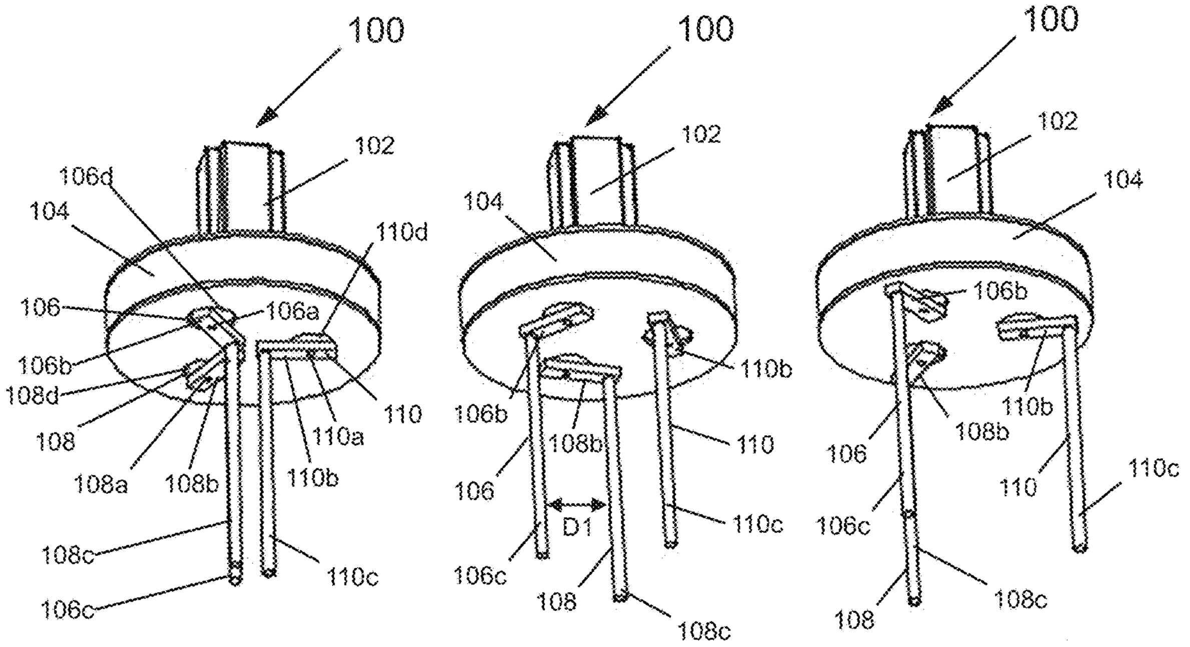
FIG. 5A, shows a perspective view of a stirring device for use in an alternative embodiment in place of the carving device of FIG. 1, in a first configuration in which the distance between the prongs is set in a narrow configuration.
FIG. 5B, shows a perspective view of the stirring device in a second configuration in which the distance between the prongs is set in a wider configuration.
FIG. 5C shows a perspective view of the stirring device in a third configuration in which the distance between the prongs is set in at its widest configuration, wider than in FIG. 5B.

FIG. 5A, shows a perspective view of a stirring device 100 at a first point in time during operation of the stirring device 100. FIG. 5B, shows a perspective view of the stirring device 100 at a second point in time during operation of the stirring device 100. FIG. 5C, shows a perspective view of the stirring device 100 at a third point in time during operation of the stirring device 100. However, it should be noted, that while the distance, such as the distance D1 shown in FIG. 5B, which may be perpendicular or substantially perpendicular to the elongated length of the prongs, the distance between prongs may be adjusted in real time during operation, however this won't necessarily occur and will depend on operational requirements.

The stirring device 100 includes stirring motor 102, member 104, a device 106, a device 108, and a device 110. The device 106 includes a pivot pin 106*a*, a member 106*b*, and an elongated member or prong 106*c* fixed to the member 106*b*. The device 108 includes a pivot pin 108*a*, a member 108*b*, and an elongated member or prong 108*c* fixed to the member 108*b*. The device 110 includes a pivot pin 110*a*, a member 110*b*, and an elongated member or prong 110*c* fixed to the member 110*b*. The pivot pins 106*a*, 108*a*, and 110*a* are configured to slide or move translationally in slots 106*d*, 108*d*, and 110*d*, to allow the distance between adjacent prongs of prongs 106*c*, 108*c* and 110*c* to be changed.

In at least one embodiment, the motor 102 drives gears which rotate the prongs 106, 108 and 110. This action is typically used to increase or decrease the distance between the prongs. In at least one embodiment, independently the entire device 100 rotates (or about section 104) in order to stir the material.

In FIG. 5A, the distance between adjacent prongs or prongs 106*c*, 108*c*, and 110*c*, is smaller than the distance between adjacent prongs of prongs 106*c*, 108*c*, and 110*c*, in FIGS. 5B and 5C, so that FIG. 5A provides the smallest stirring area of FIGS. 5A-C. The distance between adjacent prongs of prongs 106*c*, 108*c*, and 110*c* in FIG. 5B is greater than FIG. 5A and less than FIG. 5C, which provides a middle-sized stirring area. The distance between adjacent prongs of prongs 106*c*, 108*c*, and 110*c* in FIG. 5C is greater than FIGS. 5A-B, which provides the largest sized stirring area of FIGS. 5A-C.

The members 106*b*, 108*b*, and 110*b*, have rotated from the orientation shown in FIG. 5A to the orientation shown in FIG. 5B, about the pivot pins 106*a*, 108*a*, and 110*a*, respectively, and the members 106*c*, 108*c*, and 110*c*, respectively, have changed positions as a result. The members 106*b*, 108*b*, and 110*b*, have rotated from the orientation shown in FIG. 5B to the orientation shown in FIG. 5C, about the pivot pins 106*a*, 108*a*, and 110*a*, respectively, and the members 106*c*, 108*c*, and 110*c*, respectively, have changed positions as a result.

Figure 6:
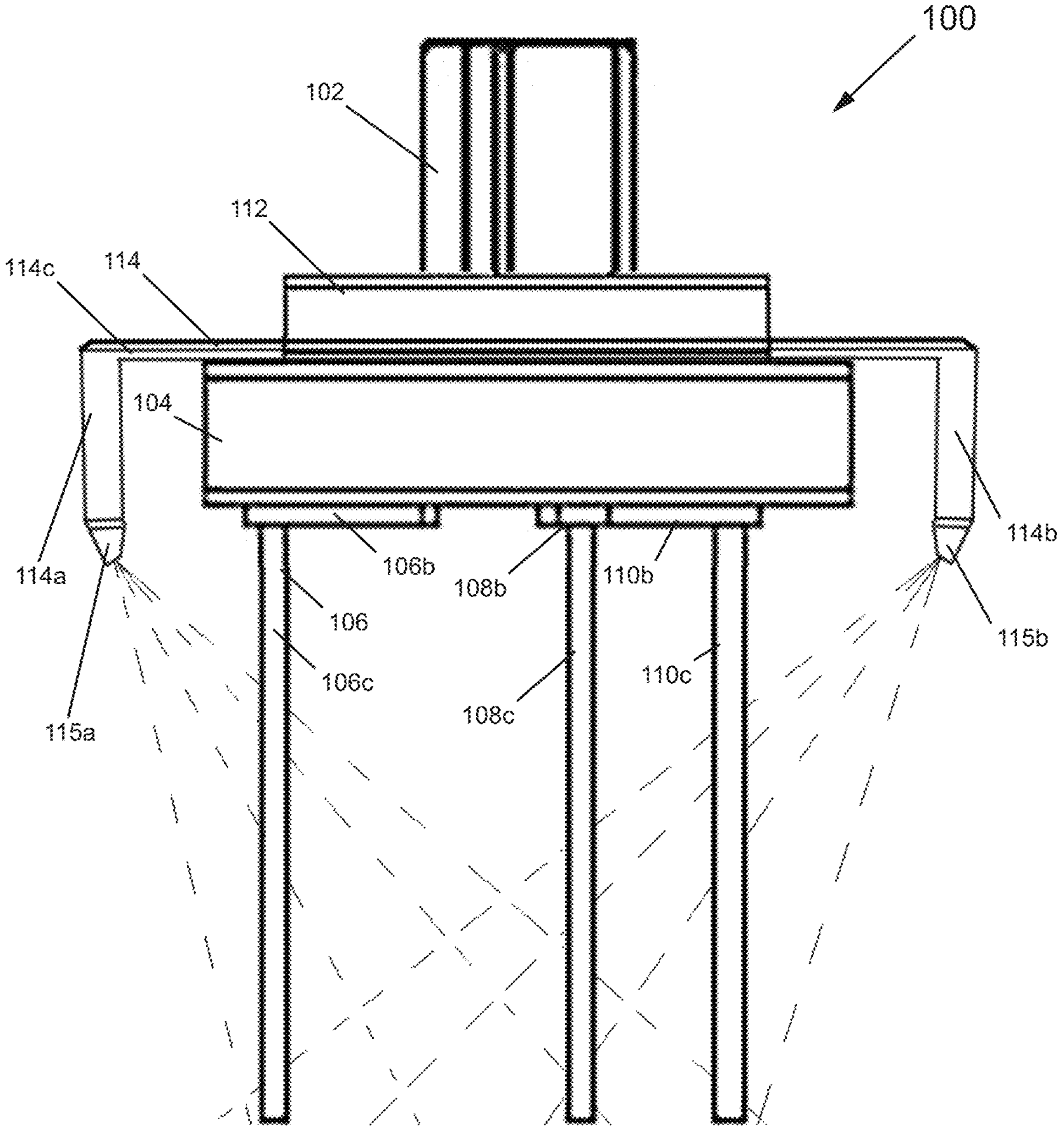
FIG. 6 shows a side view of the stirring device with a spraying device attached and demonstrating the width of a colorant being deposited.

FIG. 6 shows a side view of the stirring device 100 with a spraying device 114 attached by slip ring 112 and demonstrating the width of a colorant (shown by dashed lines) being deposited from nozzles 115*a* and 115*b*. In at least one embodiment, under control of computer processor 302 colorant may be sprayed from either nozzle 115*a* or nozzle 115*b* or both at the same time. In at least one embodiment, the width of the spray pattern and colorant used in either 115*a* or 115*b* may be adjusted in real time.

Figure 7:
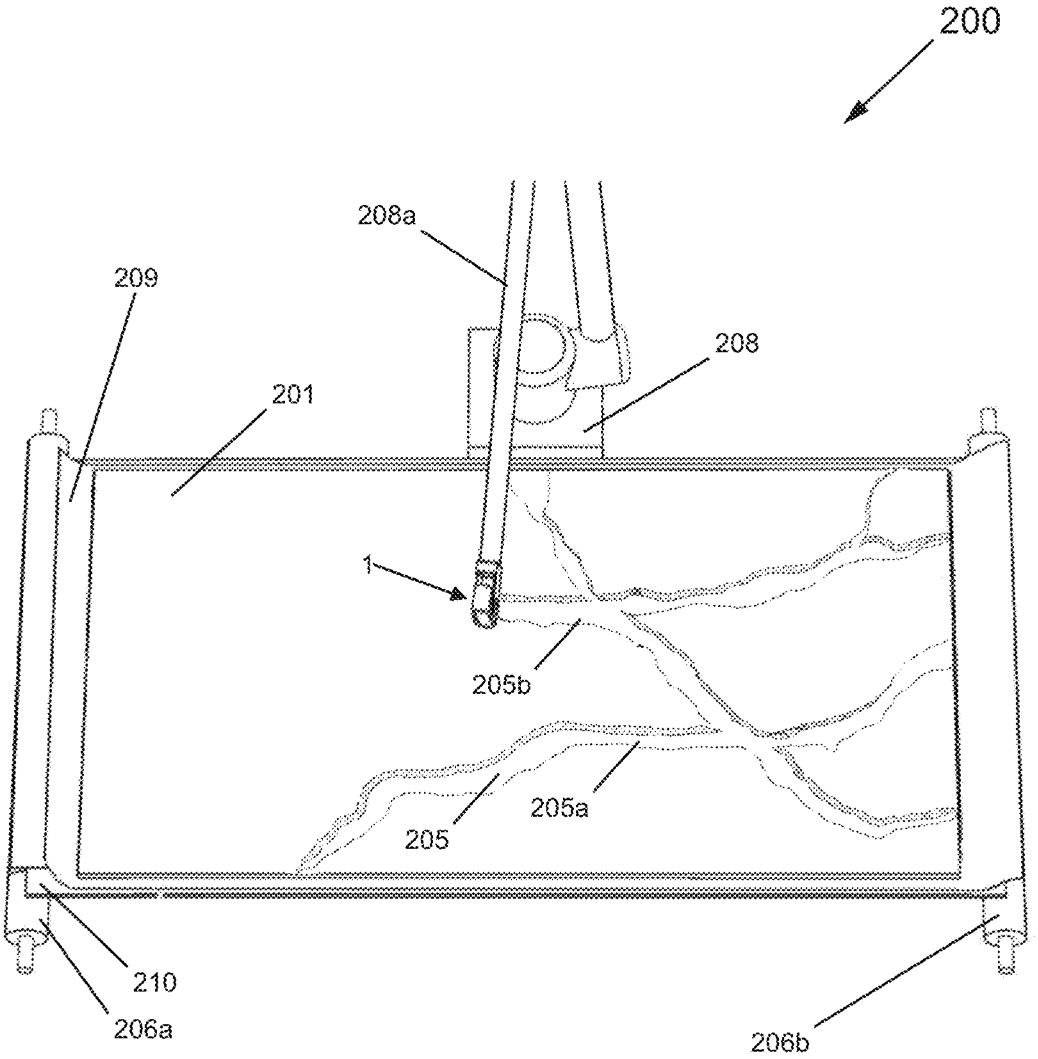
FIG. 7 shows a perspective view of the carving device during operation.

FIG. 7 shows a diagram 200 of a perspective view of the carving device 1 and a spray device attached to the robotic arm 208*a*. The stirring device 100 is not used in FIG. 7.

FIG. 7 also shows a conveyor device comprised of rollers 206*a* and 206*b*. FIG. 7 also shows a plurality of grooves 205 with different width carved by carving device 1, including grooves 205*a* and 205*b*. The diagram 200 also shows unprocessed or uncarved area 201 of a slab. There is a separation sheet 209 which can be paper, plastic or other material, typically between supporting structure 210 and mixture 201, in both FIG. 7 and FIG. 8.

Figure 8:
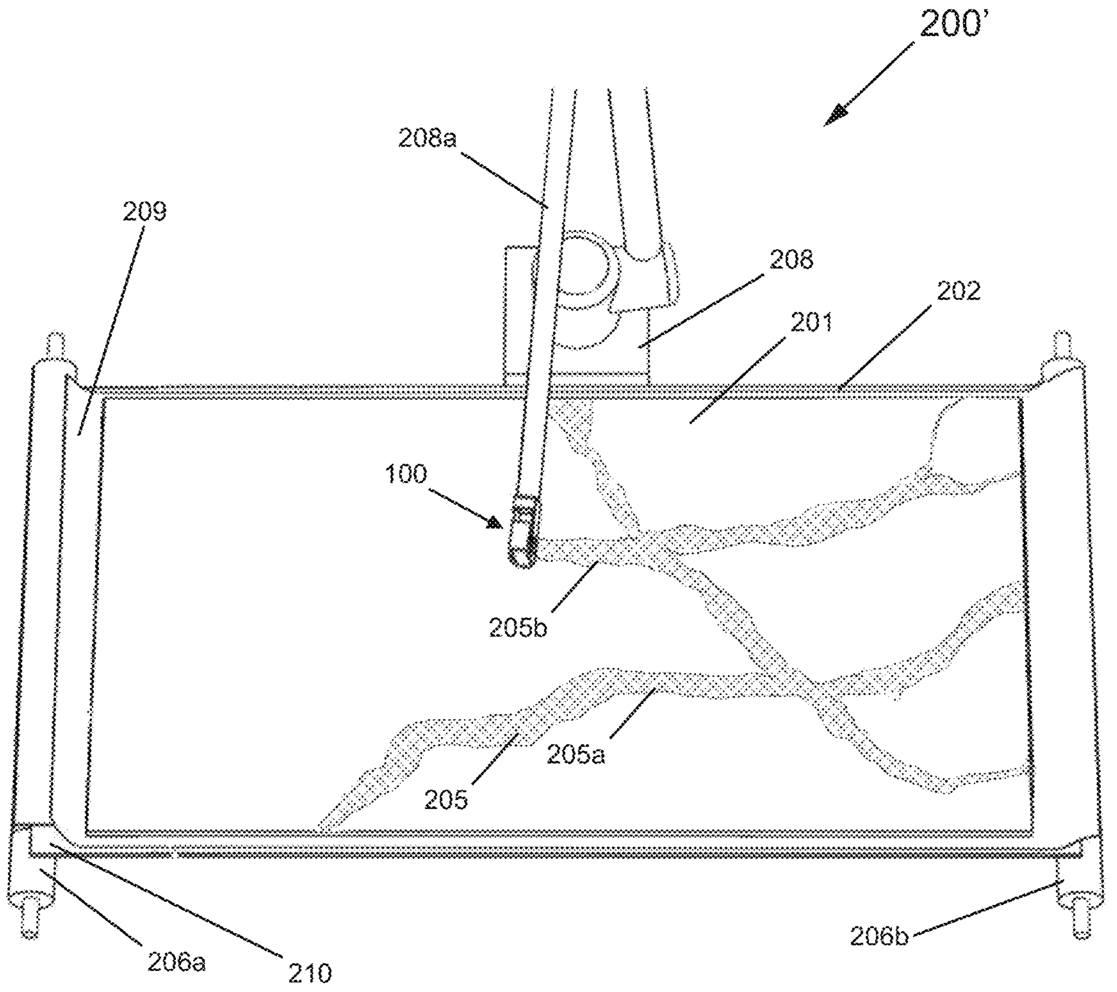
FIG. 8 shows a perspective view of the stirring device during operation.

FIG. 8 shows a perspective view of the stirring device 100 which typically includes a spray device, such including components 114, 114*a-c* and 115*a-b* shown in FIG. 6 attached to the arm 208*a* of the robotic device 208 in an alternative embodiment. The stirred and colored area 205 in FIG. 8, and the unprocessed area 201 of the slab.

Figure 9:
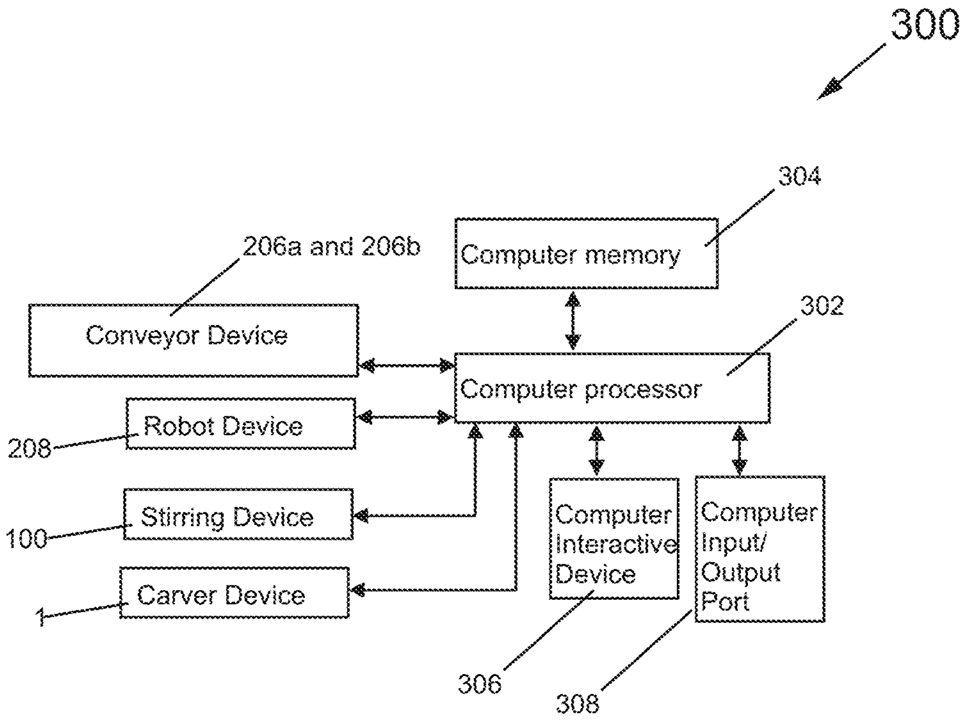
FIG. 9 shows a simplified block diagram of various components for use in accordance with one or more embodiments of the present invention, including a robotic or CNC device (Robot or computer numerical control device)
Figure 11:
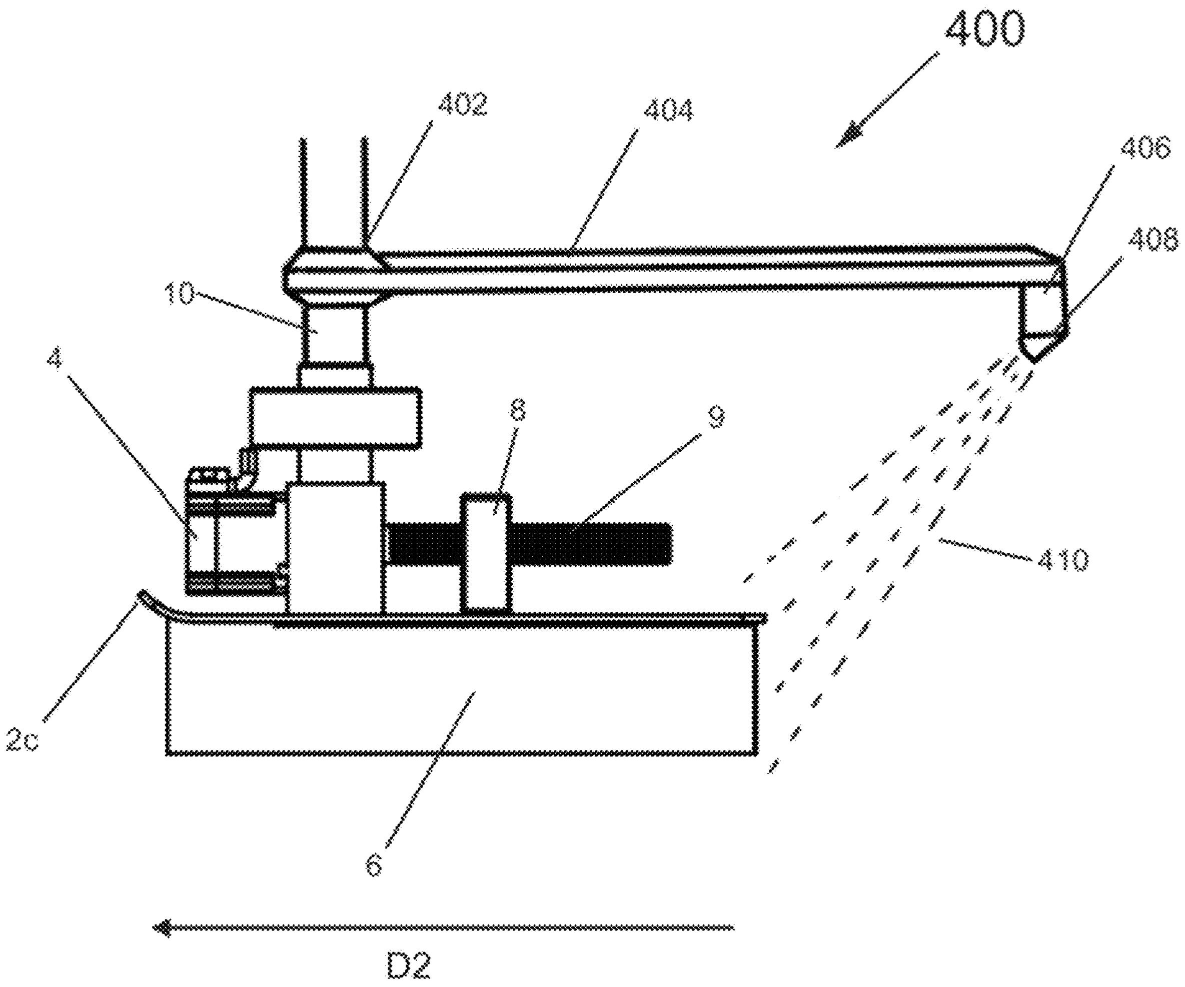
FIG. 11 shows a modified version of a carving device.

FIG. 9 shows a simplified block diagram 300 of various components for use in accordance with one or more embodiments of the present invention. The block diagram includes computer processor 302, computer memory 304, computer interactive device 306, computer input/output port 308, conveyor device 206*a* and 206*b*, robot, CNC or robotic device 208, carving device 1, and stirring device 100. The components 304, 306, 308, 206*a*, 206*b*, 208, 1, and 100 communicate with computer processor 302 which is configured to control these components in accordance with computer software stored in computer memory 304. In at least one embodiment, the carving device 1 may include a spray device attachment (such as including components 402, 404, 406, 408 as shown in FIG. 11. The stirring device 100 may include a spray device attachment having components similar or identical to components 402, 404, 406, and 408 shown in FIG. 11.

In at least one embodiment, the carving device 1 is installed and fixed on the end of arm 208*a* of the robotic device 208. The robotic arm 208 is connected and controlled through computer processor 302.

In view of the problems existing in the prior art, the present invention discloses methods and apparatuses for forming engineered stone slabs with variegated veins of varying width according to design requirements to give an appearance that more closely emulates natural stone such as marble.

In at least one embodiment of the present invention a process flow using the computer processor 302 is used to control a movement device such as a robotic arm 208*a* of robot 208 or CNC (computer numerical control), which may be attached to a tool device such as the carving device 1 or the stirring device 100 to move the tool device in the x, y and z directions. The movement device, such as robotic arm 208*a*, may also cause the tool device, (typically only one at a time) such as either carving device 1 or stirring device 100 (but note that each typically includes a spray device, such as components 402, 404, 406, and 408, shown in FIG. 10), to rotate about the z axis, the axis perpendicular to a flat surface of 201.

In at least one embodiment the tool device is the carving device 400, which is carving device 1 and spray attachment, including components 402, 404, 406, and 408. In this embodiment, the carving device 1 is lowered substantially all the way to the bottom of a base or first mixture of resin and aggregate minerals to carve a groove, such as one of plurality of grooves 205 shown in FIG. 7, in the first mixture. The carving and spray device 400 may have a variable width which may be adjusted in real time in response to computer processor 302. The groove then may be filled with a second mixture of resin and particulate minerals, (not shown) in a later process state (not shown) to simulate veins found in natural stone. Alternatively, a coloring tool, such as including components 402, 404, 406, and 408, combined with device 1 and or device 400 may be used after the groove has been carved to deposit colorant into the grooves.

In an alternative embodiment, the tool device may be the stirring device 100 with multiple prongs, such as prongs 106*c*, 108*c*, and 110*c* shown in FIG. 6, which may rotate about the z axis. The distance, such as D1 between the prongs 106*c*, 108*c*, and 110*c* may be adjusted in real time in response to a computer processor 302. The stirring device 100 may be lowered into the first mixture, by robotic arm 208*a* and rotated to flip, agitate, disrupt, or otherwise physically manipulate the first mixture. A coloring tool may be instead attached to the end of robotic arm 208*a*, to deposit colorant along the surface of the mixture while the mixture is being disrupted by the stirring device 100.

In at least one embodiment the tool device may be the carving device 1 used to carve a groove, such as one of grooves 205 shown in FIG. 7, in the first mixture. The carving device 1 may have a vertical V-shaped portion (such as shown by members 12*a* and 12*b* in FIG. 3) with a sharp angled tip 12*c* made from stainless steel, sheet metal or other type of rigid structure. The carving device 1 may have a horizontal plate 2, including 2*a* and 2*b*, shown in FIG. 3, on top of the vertical v-shaped portion of members 22*a* and 22*b*. The front section of the horizontal plate 2 and the corresponding section of the v-shaped portion may be welded or attached together indicated as 12*a*, 12*b* as shown in FIG. 3, and the width of the middle and rear section of the v-shaped portion 22*a* and 22*b* is configured to be adjusted in real time by computer processor 302. For example, the width may be adjusted from W1 shown in FIGS. 3 to W2 shown in FIG. 4.

If the width of the v is decreased (such as from W2 in FIGS. 4 to W1 in FIG. 3), the resultant channel carved will have a smaller width. Conversely, if the width of the v is increased (such as from W1 in FIGS. 3 to W2 in FIG. 4), the resultant channel carved will have a wider width. The front portion 2*c* of the horizontal plate 2 may be curved upward (as shown in FIG. 2) so that as the carving device 1 travels through the first mixture, the height of the mixture (between H1 and H2) will be pressed down by the component 2*c* from the height H1, to the height of 2*a* and 2*b*, indicated as H2 show in FIG. 2. The vertical v-shaped portion, the curved front 2*c* of the horizontal plate 2 will press the first mixture in contact downward. This slight compression will cause the first mixture to be condensed and prevent any of the first mixture from falling into the groove after the carving device 1 has carved the groove open. The rear width of the horizontal portion 2 may be wider than the vertical v shaped portion, which is the case in FIG. 3, where W1 is less than the rear width of the portion 2. This allows for the material that is on either side of the vertical v-shaped portion 22*a* and 22*b* to be pushed outward and be compressed and shaped as the carving device 1 travels through the first mixture so that to prevent material of the first mixture along the edge of the groove falls back into the groove after the carving device 1 passes through. This horizontal portion 2 may be replaced with a number of other portions or devices that may compress the edge surface of the grooves, such as a press roller or press rollers, (not shown) to prevent or substantially inhibit loss of material of the first mixture falls into the groove after the grooves are formed. As the movement device, such as robotic arm 208*a*, moves the carving device 1 through the first mixture, the carving device 1 may be configured to be rotated so that the tip 12*c* of the vertical v-shaped portion is always pointing in the direction of travel.

In at least one embodiment the tool device may be the stirring device 100 comprised of multiple prongs, such as prongs 106*c*, 108*c*, and 110*c* shown in FIGS. 5A-5B. The prongs may rotate about the z axis (which is parallel to the length of elongated prongs 106*c*, 108*c*, and 110*c*), and the distance between the prongs may be configured to be adjusted in real time by the computer processor 302. The stirring device 100 may be lowered into the first mixture to a desired depth and rotated about the z axis. The stirring device 100 may stir, agitate disrupt or otherwise physically manipulate the first mixture as the movement device, such as robotic arm 208*a*, moves the stirring device 100 along the x and/or y directions. As the movement device, such as robotic arm 208*a*, directs the movement of the stirring device 100, the distance between the prongs 106*c*, 108*c*, and 110*c* may be adjusted. If the distance between the prongs is decreased, the width of the region of the first mixture being disrupted is decreased. Conversely, if the distance between the prongs is increased, the width of the region of the first mixture being disrupted is increased. A coloring tool which is configured to move about the x and/or y directions (generally parallel to 201 in FIG. 7) may be configured along with the stirring device 100 and deposit colorant onto the surface of the first mixture as it is being disrupted by the stirring device 100. This will cause the colorant to be mixed into the depths of the disrupted region of the first mixture. The width of the region where colorant is deposited may be adjusted to match the distance between the prongs in real time. An off centered single prong device may also be used, in this case, the prong is arranged off the center axis of member 104, and is configured so that it may be adjusted to be closer or further away from the center axis of member 104 to create variable stirring areas when rotating in response to the computer process. In FIGS. 5A-C, any one of the three prongs 106, 108, or 110 can be used, without the other prongs, in at least one embodiment, since all three prongs 106, 108, and 110 are off center from member 102. In one or more embodiments, more than three prongs may be used.

In at least one embodiment, a coloring device, such as a coloring device including components 114 and 115 shown in FIG. 6, may be a spray tool such as a general-purpose computer-controlled spray gun, a screw motor fed delivery device, or other conventional dyeing device. The colorant may be a liquid, powder, or granular mixture. The colorant may include a quartz mixture. The colorant may also be a second mixture of resin and particulate minerals. The coloring device may be configured to respond to instructions from a computer processor 302 to control the quantity and timing of depositing colorant. The computer processor 302 may also control the region in which the colorant is deposited. The region in which the colorant is deposited may be controlled relative to the width of the groove or the distance between prongs in the stirring device 100. Depending on design requirements, the region in which the colorant is deposited may be wider or narrower than the groove or region being manipulated. As an example, if a second mixture is deposited, the width of the second mixture may be slightly less than the width of the groove. The coloring device may sequentially or simultaneously deposit two or more of colorants or a second mixture of resin and particulate minerals depending on design requirements. As an example, the coloring device may deposit colorant in an area wider than the groove, then deposit the second mixture into the groove so that the area occupied by the second mixture is slightly narrower than the groove.

In at least one embodiment, the apparatus may include a supporting structure 210 shown in FIGS. 7 and 8 to support the first mixture. This supporting structure 210 may be a movable operating platform such as a conveyor device including a portion of a conveyor belt which may be configured to operate in response to instructions from a computer processor 302. The apparatus may include a frame structure (not shown), which may be a frame to re-shape the four edges of the mixture after the process, that is placed on the supporting structure or conveyor belt 210, which may be configured to raise or lower in response to instructions from the computer processor 302. The frame structure may have a plurality of members to form a closed perimeter in which the mixture may be deposited into while on top of the supporting structure. Alternatively, the frame structure may be lowered on top of the first mixture after the first mixture is deposited onto the supporting structure.

In at least one embodiment, the following methods are disclosed:

(1) Physically manipulating a first mixture on top of a supporting structure, such as supporting structure 210 of FIGS. 7 and 8.

A tool device (such as either carving device 1 or stirring device 100) may be selectively lowered into a first mixture placed on a supporting structure. The tool device may be a carving device 1, in which the carving device 1 may move about the x and/or y directions to carve grooves in the first mixture. The width of the carving device 1 may be configured to be adjusted in real time by a computer processor 302 to carve a wider or narrower groove at predetermined locations according to design requirements. The tip 12*c* of the carving device 1 may rotate about the z axis to always face the direction of travel. The movement and width of the carving device 1 may be controlled by computer processor 302. The tool device may be a stirring device 100 including a single or multiple prongs. The prongs, such as 106*c*, 108*c*, and 110*c*, may be lowered into the first mixture and rotate about the z axis in order to flip, agitate, disrupt or otherwise physically manipulate the first material. The stirring device 100 may be lowered a desired amount into the first material and move about the x and/or y directions to disrupt various regions of the first material. The distance between the prongs may be adjusted in real time as controlled by computer processor 302 as the stirring device 100 moves about the x and/or y directions to control the width of the region being physically manipulated at predetermined locations.

(2) Deposting colorant into the regions of the first mixture

If the carving device 1 is used, a coloring device may deposit colorant into the grooves after they are formed. The coloring device may deposit powder, granular or liquid colorant into the grooves. Additionally, the coloring device may deposit a second mixture of resin and particulate minerals into the grooves. The timing of depositing, the amount deposited, and the width of the region in which the colorant is deposited may be adjusted according to instructions from the computer processor 302. The width of the region in which colorant is deposited may be controlled to always cover the width of the carving device 1 at the point in time in which the groove was carved; and to fill the grooves with another mixture or mixtures of resin and aggregate minerals (not shown).

If the stirring device 100 is used, a coloring device may deposit colorant at the same time as the stirring device 100 is physically manipulating the first mixture. The coloring device may deposit powder, granular or liquid colorant into the region of the first mixture being manipulated. Additionally, the coloring device may deposit a second mixture of resin and particulate minerals into the region of the first mixture being manipulated. The timing of depositing, the amount deposited, and the width of the region in which the colorant is deposited may be adjusted according to instructions from computer processor 302. The coloring device may also deposit two or more different colorants into the same region while the region of the first mixture is being manipulated by the stirring device. The width of the region in which the colorant is deposited may be controlled by the computer processor 302 to cover the distance between the prongs.

(3) Vibration and compaction of the mixture:

The mixture then undergoes further processing which includes a process of vibration and compaction while in a vacuum. The mixture is pressed into the shape of a slab for further processing including curing, trimming, grinding and polishing to convert to a finished engineered stone slab.

Figure 10:
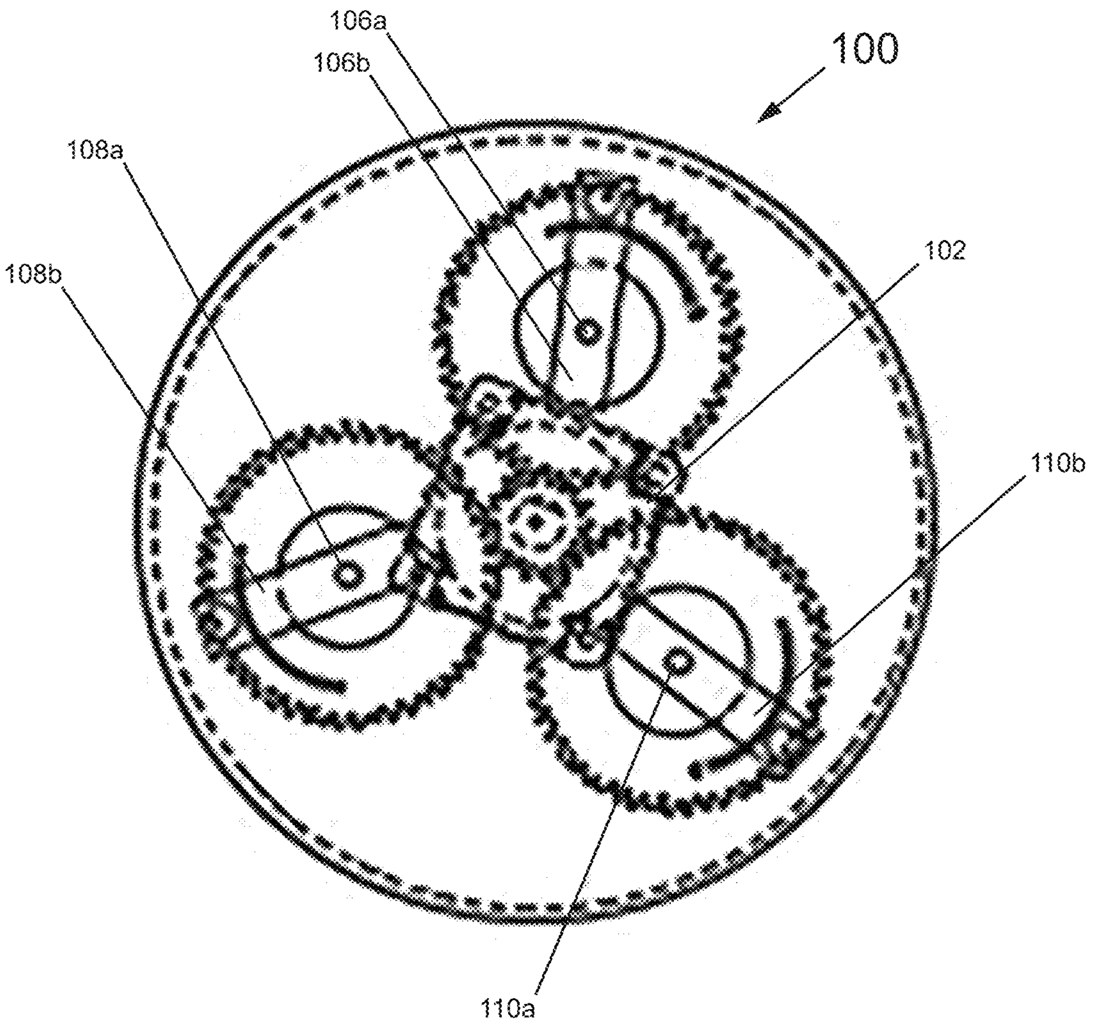
FIG. 10 shows a top view of the stirring device of FIGS. 5A-5C.

FIG. 10 shows a top view of the structure of the stirring device 100 of FIGS. 5A-5C. FIG. 11 shows a carving device 400. The carving device 400 may be identical or substantially the same as the carving device 1 of FIG. 1, except as will be described. The carving device 400 includes a connector 402 which connects to the member 10. The connector 402 connects a member 404 with the member 10. The member 404 is connected to a member 406, which is connected to a nozzle 408. In operation liquid or powder comes through the hollow member or tube 10 and into the hollow member or tube 404, then into the hollow member or tube 406, and then out the opening or nozzle 408. The liquid or powder is directed as a spray as shown by the dashed lines 410 in the wake, in the back of, or behind the member 6 of the carving device 400 as the carving device 400 is moving in the direction D2.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:

a tool device configured to be used in the manufacturing of engineered stone slabs; and wherein the tool device is configured to travel in an x-y plane in order to create a physically disrupted region in a mixture of aggregate minerals;

wherein the tool device has a mechanism which is configured to vary a width of the physically disrupted region of the mixture while traveling in the x-y plane;

wherein the tool device is a carving device with a V-shaped component having a vertex which is configured to cut through the mixture of aggregate minerals and thereby create the physically disrupted region when the carving device travels in the x-y plane; and wherein the carving device has a compression component, connected to the V-shaped component, but separate from the V-shaped component, wherein the compression component presses down on the mixture while the carving device travels in the x-y plane.

2. The apparatus of claim 1 further comprising:
a spray device; and
wherein the spray device is configured to deposit colorant in an area in a wake of travel of the tool device in the x-y plane.

3. The apparatus of claim 2 wherein
the spray device is configured to be controlled to adjust the area to match a width of the tool device during operation of the tool device.

4. The apparatus of claim 1 further comprising
a spray device; and
wherein the spray device is configured to deposit colorant in an area while the physically disrupted region is being created in the area.

5. The apparatus of claim 4 wherein
the spray device is configured to be controlled to adjust the area to match a width of the tool device during operation of the tool device.

6. The apparatus of claim 1 wherein
the tool device is controlled by a computer processor to adjust the mechanism while the tool device is travelling in the x-y plane to vary the width of the physically disrupted region.

7. The apparatus of claim 6 wherein
the tool device is controlled by the computer processor to rotate about a z-axis which is perpendicular to the x-y plane.

8. The apparatus of claim 7 further comprising:
a spray device; and
wherein the spray device is configured to deposit colorant in an area in a wake of travel of the tool device in the x-y plane.

9. The apparatus of claim 7 further comprising
a spray device; and
wherein the spray device is configured to deposit colorant in an area while the physically disrupted region is being created in the area.

10. The apparatus of claim 1 wherein
the carving device is configured to rotate about a z-axis which is perpendicular to the x-y plane, so that the vertex of the V-shaped component of the carving device always points in the direction of travel of the carving device in the x-y plane.

11. An apparatus comprising:
a tool device configured to be used in the manufacturing of engineered stone slabs; and
wherein the tool device is configured to travel in an x-y plane in order to create a physically disrupted region in a mixture of aggregate minerals; and
wherein the tool device has a mechanism which is configured to vary a width of the physically disrupted region of the mixture while traveling in the x-y plane;
wherein
the tool device is a stirring device having one or more prongs;
wherein the one or more prongs are configured to rotate to disrupt the mixture while the tool device travels in the x-y plane in the mixture to thereby create the physically disrupted region in the mixture;
wherein the one or more prongs include a first prong;
wherein the tool device is configured to rotate about a first axis of rotation;
and wherein a distance between the first prong and the first axis of rotation is configured to be adjustable in real time during operation of the tool device to thereby adjust the width of the physically disrupted region.

12. The apparatus of claim 11 wherein
the distance between the first prong and the first axis of rotation is configured to be adjustable in real time by a computer processor during operation of the tool device.

13. The apparatus of claim 11 further comprising:
a spray device; and
wherein the spray device is configured to deposit colorant in an area in a wake of travel of the tool device in the x-y plane.

14. The apparatus of claim 13 wherein
the spray device is configured to be controlled to adjust the area to match a width of the tool device during operation of the tool device.

15. The apparatus of claim 11 further comprising
a spray device; and
wherein the spray device is configured to deposit colorant in an area while the physically disrupted region is being created in the area.

16. The apparatus of claim 15 wherein
the spray device is configured to be controlled to adjust the area to match a width of the tool device during operation of the tool device.

17. An apparatus comprising:
a tool device configured to be used in the manufacturing of engineered stone slabs; and
wherein the tool device is configured to travel in an x-y plane in order to create a physically disrupted region in a mixture of aggregate minerals; and
wherein the tool device has a mechanism which is configured to vary a width of the physically disrupted region of the mixture while traveling in the x-y plane;
wherein the tool device is a stirring device having one or more prongs; and
wherein the one or more prongs are configured to rotate to disrupt the mixture while the tool device travels in the x-y plane in the mixture to thereby create the physically disrupted region in the mixture;
wherein
the one or more prongs include a plurality of prongs; and
wherein a distance of each of the plurality of prongs to a most adjacent other prong of the plurality of prongs is configured to be adjustable in real time during operation of the tool device to thereby adjust the width of the physically disrupted region.

18. The apparatus of claim 17 further comprising:
a spray device; and
wherein the spray device is configured to deposit colorant in an area in a wake of travel of the tool device in the x-y plane.

19. The apparatus of claim 18 wherein
the spray device is configured to be controlled to adjust the area to match a width of the tool device during operation of the tool device.

20. The apparatus of claim 17 further comprising
a spray device; and
wherein the spray device is configured to deposit colorant in an area while the physically disrupted region is being created in the area.

21. The apparatus of claim 20 wherein
the spray device is configured to be controlled to adjust the area to match a width of the tool device during operation of the tool device.

22. A method comprising the steps of:
causing a tool device to travel in an x-y plane in order to create a physically disrupted region in a mixture of aggregate minerals;
using a mechanism of the tool device to vary a width of the physically disrupted region of the mixture while traveling in the x-y plane; and
wherein the tool device configured to be used in the manufacturing of engineered stone slabs;
wherein the tool device is a carving device with a V-shaped component having a vertex which is configured to cut through the mixture of aggregate minerals and thereby create the physically disrupted region when the carving device travels in the x-y plane; and
wherein the carving device has a compression component, connected to the V-shaped component, but separate from the V-shaped component, wherein the compression component presses down on the mixture while the carving device travels in the x-y plane.

23. The method of claim 22 wherein
a spray device is connected to the tool device; and
wherein the spray device is configured to deposit colorant in an area in a wake of travel of the tool device in the x-y plane.

24. The method of claim 23 further comprising
controlling the spray device to adjust the area to match a width of the tool device during operation of the tool device.

25. The method of claim 22 wherein
a spray device is connected to the tool device; and
further comprising using the spray device to deposit colorant in an area while the physically disrupted region is being created in the area.

26. The method of claim 25 further comprising
controlling the spray device to adjust the area to match a width of the tool device during operation of the tool device.

27. The method of claim 12
wherein the carving device has a mechanism that allows a width of the carving device to be adjusted to thereby adjust the width of the physically disrupted region while moving in the x-y plane in the mixture.

28. The method of claim 27 wherein
the carving device is configured to rotate about a z-axis which is perpendicular to the x-y plane, so that the vertex of the V-shaped component of the carving device always points in the direction of travel of the carving device in the x-y plane.

29. The method of claim 22 further comprising
using a computer processor to control the tool device to adjust the mechanism while the tool device is travelling in the x-y plane to vary the width of the physically disrupted region.

30. The method of claim 29 further comprising
using the computer processor to control the tool device to rotate about a z-axis which is perpendicular to the x-y plane.

31. The method of claim 30 wherein
a spray device is connected to the tool device; and further comprising
using the spray device to deposit colorant in an area in a wake of travel of the tool device in the x-y plane.

32. The method of claim 30 wherein
a spray device is connected to the tool device; and further comprising:
using the spray device to deposit colorant in an area while the physically disrupted region is being created in the area.

33. A method comprising the steps of:
causing a tool device to travel in an x-y plane in order to create a physically disrupted region in a mixture of aggregate minerals;
using a mechanism of the tool device to vary a width of the physically disrupted region of the mixture while traveling in the x-y plane; and
wherein the tool device configured to be used in the manufacturing of engineered stone slabs;
wherein
the tool device is a stirring device having one or more prongs; and
wherein the one or more prongs are configured to rotate to disrupt the mixture while the tool device travels in the x-y plane in the mixture to thereby create the physically disrupted region in the mixture;
wherein the one or more prongs include a first prong;
wherein the tool device is configured to rotate about a first axis of rotation;
and wherein a distance between the first prong and the first axis of rotation is configured to be adjustable in real time during operation of the tool device to thereby adjust the width of the physically disrupted region.

34. The method of claim 33 wherein
a spray device is connected to the tool device; and
wherein the spray device is configured to deposit colorant in an area in a wake of travel of the tool device in the x-y plane.

35. The method of claim 34 further comprising
controlling the spray device to adjust the area to match a width of the tool device during operation of the tool device.

36. The method of claim 33 wherein
a spray device is connected to the tool device; and
further comprising using the spray device to deposit colorant in an area while the physically disrupted region is being created in the area.

37. The method of claim 36 further comprising controlling the spray device to adjust the area to match a width of the tool device during operation of the tool device.

38. A method comprising the steps of:
causing a tool device to travel in an x-y plane in order to create a physically disrupted region in a mixture of aggregate minerals;
using a mechanism of the tool device to vary a width of the physically disrupted region of the mixture while traveling in the x-y plane;
wherein the tool device configured to be used in the manufacturing of engineered stone slabs;
wherein the tool device is a stirring device having one or more prongs;
wherein the one or more prongs are configured to rotate to disrupt the mixture while the tool device travels in the x-y plane in the mixture to thereby create the physically disrupted region in the mixture;
wherein the one or more prongs include a first prong;
wherein the tool device is configured to rotate about a first axis of rotation;
wherein
the one or more prongs include a plurality of prongs; and
wherein a distance of each of the plurality of prongs to a most adjacent other prong of the plurality of prongs is configured to be adjustable in real time during operation of the tool device to thereby adjust the width of the physically disrupted region.

39. The method of claim 38 wherein
a spray device is connected to the tool device; and
wherein the spray device is configured to deposit colorant in an area in a wake of travel of the tool device in the x-y plane.

40. The method of claim 39 further comprising
controlling the spray device to adjust the area to match a width of the tool device during operation of the tool device.

41. The method of claim 38 wherein
a spray device is connected to the tool device; and
further comprising using the spray device to deposit colorant in an area while the physically disrupted region is being created in the area.

42. The method of claim 41 further comprising
controlling the spray device to adjust the area to match a width of the tool device during operation of the tool device.

43. An apparatus comprising:
a tool device configured to be used in the manufacturing of engineered stone slabs; and
wherein the tool device is configured to travel in an x-y plane in order to create a physically disrupted region in a mixture of aggregate minerals;
wherein the tool device has a mechanism which is configured to vary a width of the physically disrupted region of the mixture while traveling in the x-y plane;
wherein the tool device is a carving device with a V-shaped component having a vertex which is configured to cut through the mixture of aggregate minerals and thereby create the physically disrupted region when the carving device travels in the x-y plane;
wherein the V-shaped component is comprised of:
a first member having a first end and a second end; and
a second member having a first end and a second end;
wherein the first end of the first member is located at the vertex, and the first end of the second member is located at the vertex, such that the first member and the second member come together at their respective first ends;
further comprising a horizontal component to press down on the mixture of aggregate materials as the carving device travels in the x-y plane through the first mixture; and
wherein at least part of the first member and at least part of the second member are configured to be changed in orientation with respect to the vertex, so that the first end of the first member and the first end of the second member remain stationary while the second end of the first member and the second end of the second member move further apart or closer together, to thereby vary the width of the physically disrupted region of the mixture while the tool device is traveling in the x-y plane.

44. An apparatus comprising:
a tool device configured to be used in the manufacturing of engineered stone slabs; and
wherein the tool device is configured to travel in an x-y plane in order to create a physically disrupted region in a mixture of aggregate minerals;
wherein the tool device has a mechanism which is configured to vary a width of the physically disrupted region of the mixture while traveling in the x-y plane;
wherein the tool device is a carving device with a V-shaped component having a vertex which is configured to cut through the mixture of aggregate minerals and thereby create the physically disrupted region when the carving device travels in the x-y plane;
wherein the V-shaped component is comprised of:
a first member having a first end and a second end;
a second member having a first end and a second end;
a third member having a first end and a second end; and
a fourth member having a first end and a second end;
wherein the first end of the first member is located at the vertex, and the first end of the second member is located at the vertex, such that the first member and the second member come together at their respective first ends;
wherein the second end of the first member is separated by a distance from the second end of the second member;
wherein the first end of the third member is located at the second end of the first member;
wherein the first end of the fourth member is located at the second end of the second member;
further comprising a horizontal plate;
wherein the first and second members are fixed in location and orientation with respect to the horizontal plate; and
wherein the third and fourth members are configured to pivot with respect to the horizontal plate, so that their first ends remain stationary while their second ends move further apart or closer together, to thereby vary the width of the physically disrupted region of the mixture while the tool device is traveling in the x-y plane.

* * * * *